US007363498B2

(12) United States Patent
Hennessey et al.

(10) Patent No.: US 7,363,498 B2
(45) Date of Patent: Apr. 22, 2008

(54) METHOD AND APPARATUS FOR FACILITATING SECURE DISTRIBUTED CONTENT DELIVERY

(75) Inventors: Wade L Hennessey, Palo Alto, CA (US); John B. Wainwright, Los Gatos, CA (US)

(73) Assignee: Kontiki, Inc., Sunnyvale, CA (US)

( * ) Notice: Subject to any disclaimer, the term of this patent is extended or adjusted under 35 U.S.C. 154(b) by 504 days.

(21) Appl. No.: 10/211,600

(22) Filed: Aug. 2, 2002

(65) Prior Publication Data

US 2003/0028777 A1 Feb. 6, 2003

Related U.S. Application Data

(60) Provisional application No. 60/310,306, filed on Aug. 4, 2001.

(51) Int. Cl.
*H04L 9/00* (2006.01)
*H04L 9/32* (2006.01)
(52) U.S. Cl. .......................................... 713/176; 726/26
(58) Field of Classification Search ................ 713/176
See application file for complete search history.

(56) References Cited

U.S. PATENT DOCUMENTS

| 4,712,239 | A | * | 12/1987 | Frezza et al. | ................ | 380/242 |
| 5,884,031 | A | * | 3/1999 | Ice | ............................. | 709/203 |
| 6,738,932 | B1 | * | 5/2004 | Price | ........................... | 714/38 |
| 2001/0049732 | A1 | * | 12/2001 | Raciborski et al. | .......... | 709/224 |
| 2002/0035681 | A1 | | 3/2002 | Guillermo et al. | .......... | 713/151 |
| 2002/0194484 | A1 | * | 12/2002 | Bolosky et al. | ............. | 713/189 |

FOREIGN PATENT DOCUMENTS

EP 0 848 316 A2 6/1998

(Continued)

OTHER PUBLICATIONS

Wayback Machine archive of Kazaa, accessed on Dec. 21, 2005, published date Dec. 1, 2000, http://web.archive.org/web/20001201223800/www.kazaa.com/index.php?page#technology.*

(Continued)

*Primary Examiner*—Nasser Moazzami
*Assistant Examiner*—Brandon S Hoffman
(74) *Attorney, Agent, or Firm*—Blakely, Sokoloff, Taylor & Zafman, LLP; Judith A. Szepesi

(57) ABSTRACT

One embodiment of the present invention provides a system that facilitates receiving content from a primary peer and forwarding it to a secondary peer, wherein blocks of the content are sent to the secondary peer prior to all of the blocks of the content being received from the primary peer. The system starts by receiving an encrypted list of checksums from a server, wherein each checksum in the list is associated with a corresponding block of the content. Next, the system decrypts the encrypted list of checksums to form a list of decrypted checksums. The system then receives a block of the content from the primary peer and calculates a checksum for the block of the content. The system subsequently compares the calculated checksum with a corresponding checksum from the list of decrypted checksums received from the server. If the calculated checksum matches the corresponding checksum, the system sends the block of the content to the secondary peer.

42 Claims, 7 Drawing Sheets

FOREIGN PATENT DOCUMENTS

| | | | |
|---|---|---|---|
| EP | 848316 A2 | * | 6/1998 |
| WO | WO 01/93064 A1 | | 12/2001 |
| WO | WO 02/057917 A2 | | 7/2002 |

OTHER PUBLICATIONS

Microsoft Press Computer Dictionary, Third Edition, 1997, pp. 88-89, definition of checksum.*

Liang, Jian, et al. "Understanding KaZaA," http://cis.poly.edu/~ross/papers/UnderstandingKaZaA.pdf, accessed Mar. 15, 2007, 7 pages.

http://en.wikipedia.org/wiki/BitTorrent, accessed Mar. 15, 2007, 13 pages.

* cited by examiner

METHOD AND APPARATUS FOR FACILITATING SECURE DISTRIBUTED CONTENT DELIVERY

RELATED APPLICATION

This application hereby claims priority under 35 U.S.C. §119 to U.S. Provisional Patent Application No. 60/310,306, filed on 4 Aug. 2001, entitled "Method and Apparatus for Enabling the Rich Media Revolution," by inventors Wade L. Hennessey, John B. Wainwright, Anthony A. Espinoza, Christopher G. Saito and Michael J. Homer.

BACKGROUND

1. Field of the Invention

The present invention relates to computer networks. More specifically, the present invention relates to a method and an apparatus for facilitating secure distributed content delivery across a computer network.

2. Related Art

The explosion of broadband communications has helped the Internet become a viable distribution mechanism for multimedia and high quality video. Prior to broadband, conventional modems were much too slow for the large file sizes that video demands. Now that more and more people have broadband connections and are requesting ever larger items of content, bandwidth and server utilization is quickly becoming a bottleneck on the distribution end. For example, in some cases, extraordinary events have brought online news sites to a virtual standstill as people flocked to them to retrieve video of the events.

Some companies have tried to solve this problem by creating distributed content delivery networks. In a distributed content delivery network, once a client has received a file, that client becomes a potential server for that file to other clients. This is a great advantage because as clients download the content, the number of potential servers for the content grows. In this way, the classic bottleneck caused by many clients trying to retrieve the same content from a single server is virtually eliminated.

However, one major problem in this type of system is security, because all of intermediate nodes on the network through which the content passes have access to the content. Hence, it is important to be able to tell if a piece of the content has been tampered with or corrupted during transport. If one client upstream is compromised, all of the clients downstream may receive compromised copies of the content. Although packets typically include checksums to ensure integrity, these checksums can be tampered with as well.

Another possible solution is to include a checksum with the content itself, but the entire content would have to be received in order to allow the checksum to be calculated and verified. This results in the client having to wait until a file is completely downloaded and verified before it can be sent to other clients. This problem is compounded by the fact that a large item of content may potentially be forwarded through a large number of clients, each one of which would have to wait for the file to be completely downloaded and verified before forwarding the content to a subsequent client.

What is needed is a method and apparatus for facilitating the distributed delivery of content across a network in a secure manner without the above-described problems associated with existing distributed content delivery networks.

SUMMARY

One embodiment of the present invention provides a system that facilitates receiving content from a primary peer and forwarding it to a secondary peer, wherein blocks of the content are sent to the secondary peer prior to all of the blocks of the content being received from the primary peer. The system starts by receiving an encrypted list of checksums from a server, wherein each checksum in the list is associated with a corresponding block of the content. Next, the system decrypts the encrypted list of checksums to form a list of decrypted checksums. The system then receives a block of the content from the primary peer and calculates a checksum for the block of the content. The system subsequently compares the calculated checksum with a corresponding checksum from the list of decrypted checksums received from the server. If the calculated checksum matches the corresponding checksum, the system sends the block of the content to the secondary peer.

In a variation on this embodiment, the system uses a source public key to verify a digital signature received with the encrypted list of checksums.

In a variation on this embodiment, each block of the content spans multiple network packets.

In a variation on this embodiment, each block of the content spans multiple disk blocks.

In a variation on this embodiment, different blocks of the content are received from different primary peers.

In a variation on this embodiment, blocks of content are sent to multiple secondary peers.

In a variation on this embodiment, decrypting the encrypted list of checksums involves decrypting the encrypted list of checksums using a destination private key.

In a variation on this embodiment, receiving the block of the content from the primary peer involves receiving an encrypted block of the content.

In a variation on this embodiment, sending the block of the content to the secondary peer involves encrypting the block of content to form an encrypted block of content that is sent to the secondary peer.

One embodiment of the present invention provides a system that facilitates publishing content in a distributed content delivery network. The system starts by receiving a request at a server to publish content along with the content to be published. Next, the server divides the content into blocks and calculates a checksum for each block. The server then encrypts the calculated checksums to form an encrypted list of the checksums. The encrypted list of checksums is subsequently used by peers to verify that blocks of the content are properly received.

In a variation on this embodiment, encrypting the checksums involves using a destination public key to encrypt the checksums.

In a variation on this embodiment, the system additionally uses a source private to digitally sign the encrypted list of checksums.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
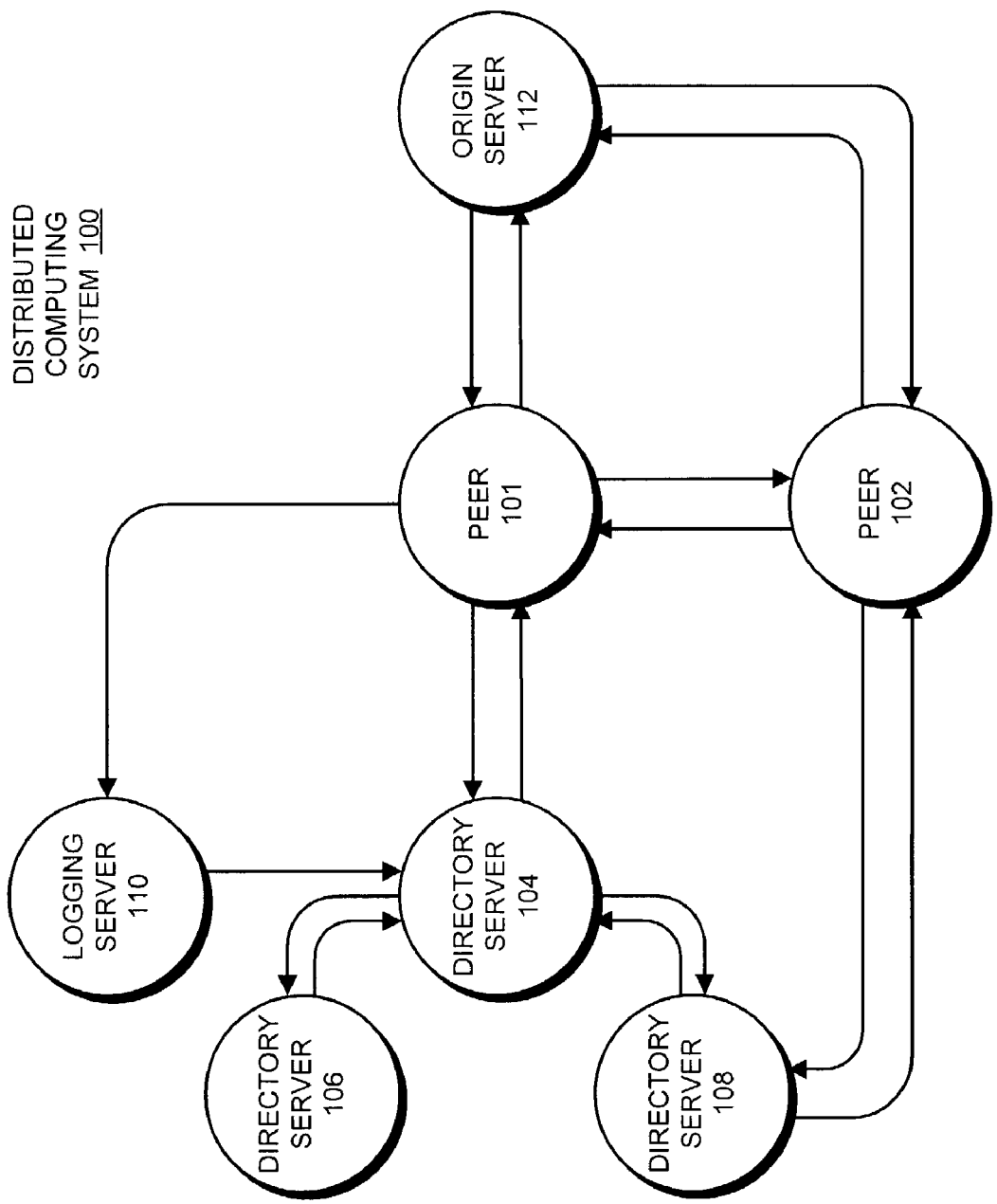
FIG. 1 illustrates a distributed computer system in accordance with an embodiment of the present invention.

FIG. 1 illustrates a distributed computing system 100 in accordance with an embodiment of the present invention. Distributed computing system 100 contains peer 101 and peer 102. Peers 101 and 102 can generally include any node on a network including computational capability and including a mechanism for communicating across the network. Note that peers 101 and 102 can act as clients and as candidate servers that can potentially serve content to other clients. FIG. 1 also contains directory servers 104, 106 and 108, logging server 110, and origin server 112. Servers 104, 106, 108, 110 and 112 can generally include any nodes on a computer network including a mechanism for servicing requests from a client for computational and/or data storage resources.

In one embodiment of the present invention, peer 101 sends a request for content to directory server 104. Directory server 104 may additionally forward or redirect the request on to directory server 106 or directory server 108. Directory server 104 then sends a list of potential candidates back to peer 101. Note that any time a peer makes a request for content, then that peer becomes a potential candidate server for the content and may appear in the list of potential candidate servers that is forwarded to other clients. This list of candidates can optionally identify origin server 112 which contains the original source for the content. Peer 101 then uses this list to request content from peer 102. Peer 101 also sends feedback information back to logging server 110, such as the parts of the content that it has and the servers that it has tried to download from. Logging server 110 subsequently forwards the feedback information from peer 101 to directory server 104. Directory server 104 uses this information in response to future requests for the content.

Directory Server Architecture

Figure 2:
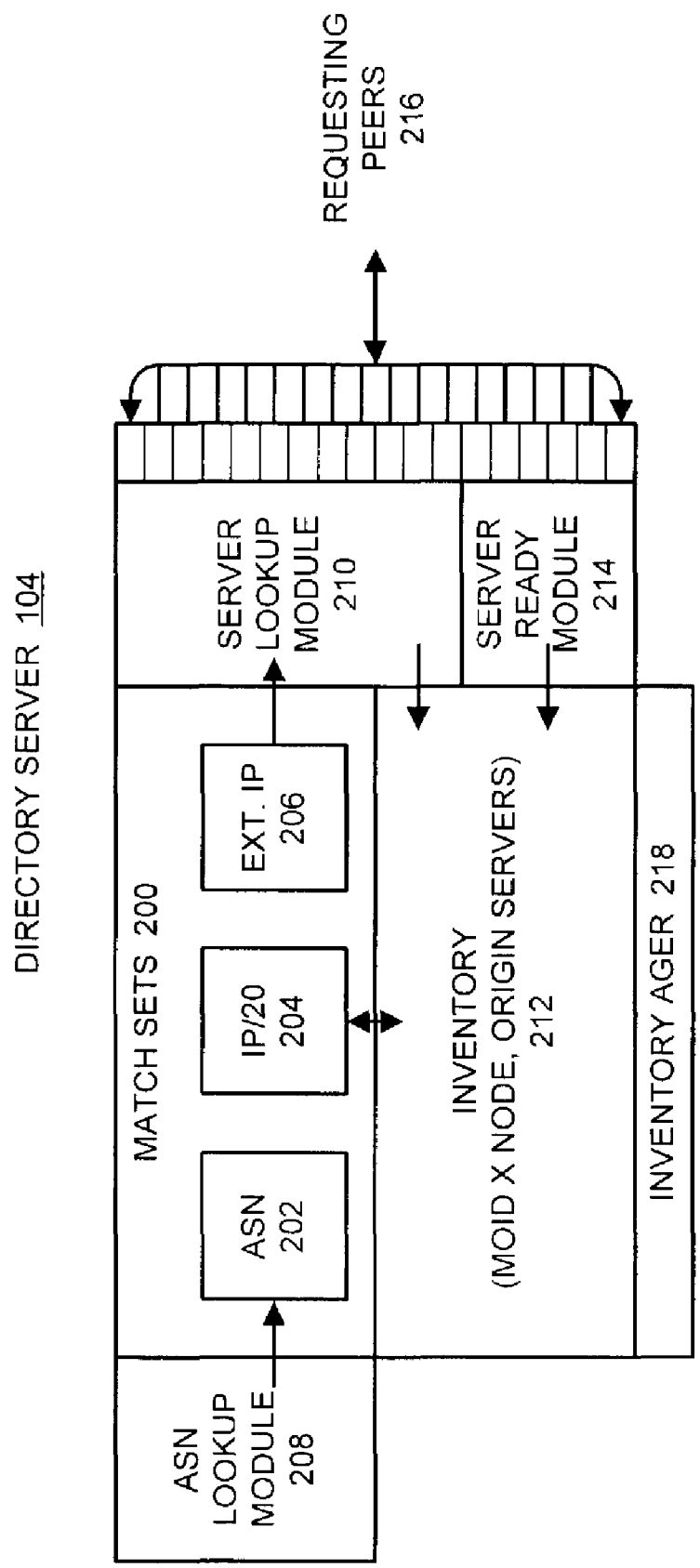
FIG. 2 illustrates the directory server architecture in accordance with an embodiment of the present invention.

FIG. 2 illustrates the architecture of directory server 104 in accordance with an embodiment of the present invention. Directory server 104 contains inventory 212. Inventory 212 includes a list of the potential candidates for items of content that have been published. When one of the requesting peers 216 submits a request to directory server 104 for content, ASN lookup module 208 determines the autonomous system number (ASN) of the autonomous system (AS) of which the peer is a member.

Directory server 104 maintains a set of prioritized lists of inventory 212 based on the items in match sets 200. These items include ASN 202, IP/20 network 204, and external IP address 206. Note that an IP/20 network is a collection of nodes that share a common IP address prefix consisting of 20 bytes. Moreover, an external IP address can include an IP address that has been assigned by a Network Address Translation (NAT) or similar device and can be different from the host's internal IP address. Server lookup module 210 determines the external IP address 206 of the peer and places the information in inventory 212. If a candidate server has an identical external IP address to that of the peer, then it is likely to be topologically close to the peer. Likewise, if it is a member of the same IP/20 network as the peer, then it is also likely relatively to be topologically close to the peer.

Server ready module 214 receives feedback information reported by requesting peers 216 (server ready reports) and updates inventory 212. Inventory ager 218 removes candidates from inventory 212 if directory server 104 has not heard from the candidate servers within a certain period of time.

Network with Firewalls

Figures 3, 4, 5:
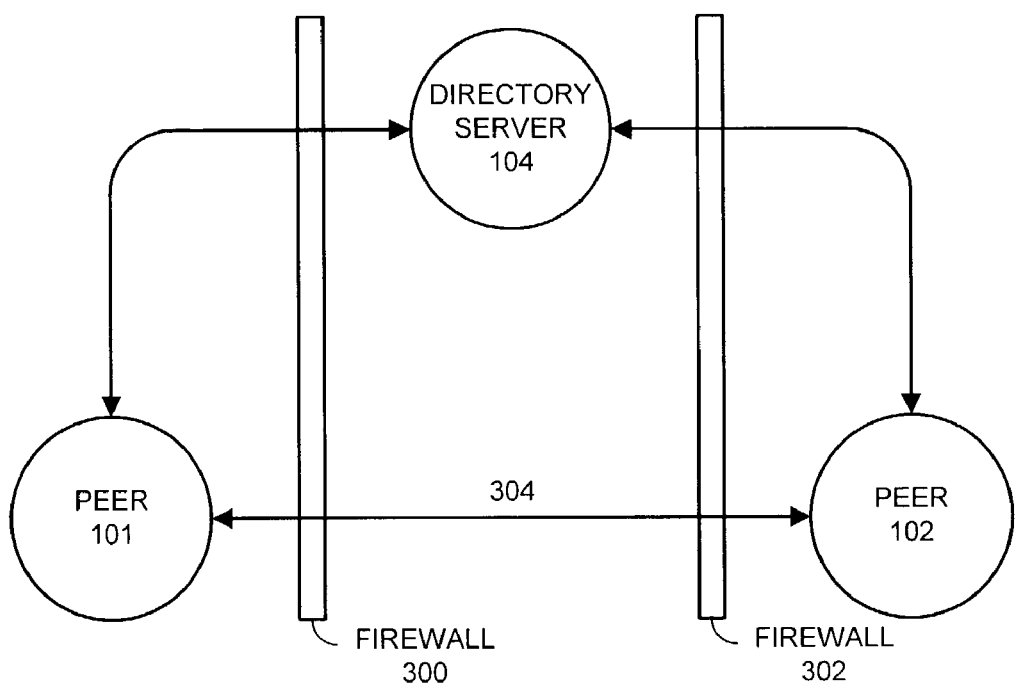
FIG. 3 illustrates a network with firewalls in accordance with an embodiment of the present invention.
FIG. 4 illustrates the attributes of a content request in accordance with an embodiment of the present invention.
FIG. 5 illustrates the directory server inventory in accordance with an embodiment of the present invention.

FIG. 3 illustrates a network with firewalls in accordance with an embodiment of the present invention. In FIG. 3, peer 101 is located behind firewall 300 and peer 102 is located behind firewall 302. Moreover, both peer 101 and peer 102 communicate with directory server 104 through their respective firewalls. During this communication, peer 101 requests content from directory server 104. Next, directory server 104 sends a list of candidate servers, including peer 102, to peer 101. Peer 101 then sends a request to peer 102 for the content via User Datagram Protocol (UDP). Directory server 104 also sends a request to peer 102 to send the content to peer 101. Peer 102 sends a packet to peer 101 via UDP. (Note that in general other connectionless protocols can be used instead of UDP.) Since the request from peer 101 to peer 102 and the packet from peer 102 to peer 101 were sent via a connectionless protocol, they open ports in firewalls 300 and 302 that allows a connection 304 to be established between peer 101 and peer 102.

Attributes of a Content Request

FIG. 4 illustrates the attributes of a content request in accordance with an embodiment of the present invention. Incoming request 400 includes the following attributes:

internal IP address 402; external IP address 404, and MOID 408. Note that MOID 408 is a unique identifier of the content that is assigned when the content is published. Internal IP address 402 is the IP address assigned at the node, and external IP address 404 is the IP address of a Network Address Translation (NAT) or similar device. Note that with the popularity of NAT devices, it is very common for peers in a NAT enabled LAN to have different internal IP addresses and an identical external IP address. It is also possible to analyze the content request to determine the ASN for the requestor's AS. ASN is the identifier of the Autonomous System (AS) for which a node belongs.

Directory Server Inventory

FIG. 5 illustrates the directory server inventory 212 from FIG. 2 in accordance with an embodiment of the present invention. Inventory 212 includes a list of all of the content and possible candidate servers of the content that are known by directory server 104. Inventory 212 also contains MOID 408 which identifies the content, node 502 which identifies a candidate server for the content, and range set 504 which identifies the pieces of the content that the candidate server has been reported as having in the past. In one embodiment of the present invention, node 502 is identified using standard PKI techniques.

Initial Content Request

Figure 6:
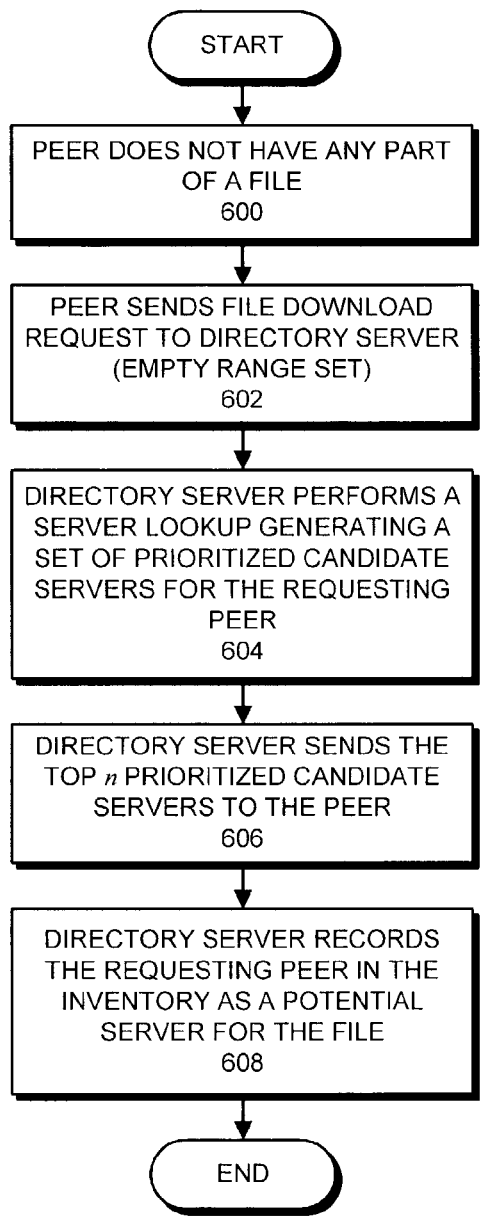
FIG. 6 illustrates processing of an initial content request in accordance with an embodiment of the present invention.

FIG. 6 illustrates processing of an initial content request in accordance with an embodiment of the present invention. The system starts when content is requested and peer 101 does not have any part of the content (step 600).

First, peer 101 sends a file download request to directory server 104 with an empty range set (step 602). Next, directory server 104 performs a server lookup from inventory 212 and generates a prioritized list of candidate servers for the content (step 604). Then, directory server 104 returns the top n candidate servers from the prioritized list to peer 101 (step 606). Finally, directory server 104 records peer 101 in inventory 212 as a possible future candidate server for the content (step 608).

Subsequent Content Request

Figure 7:
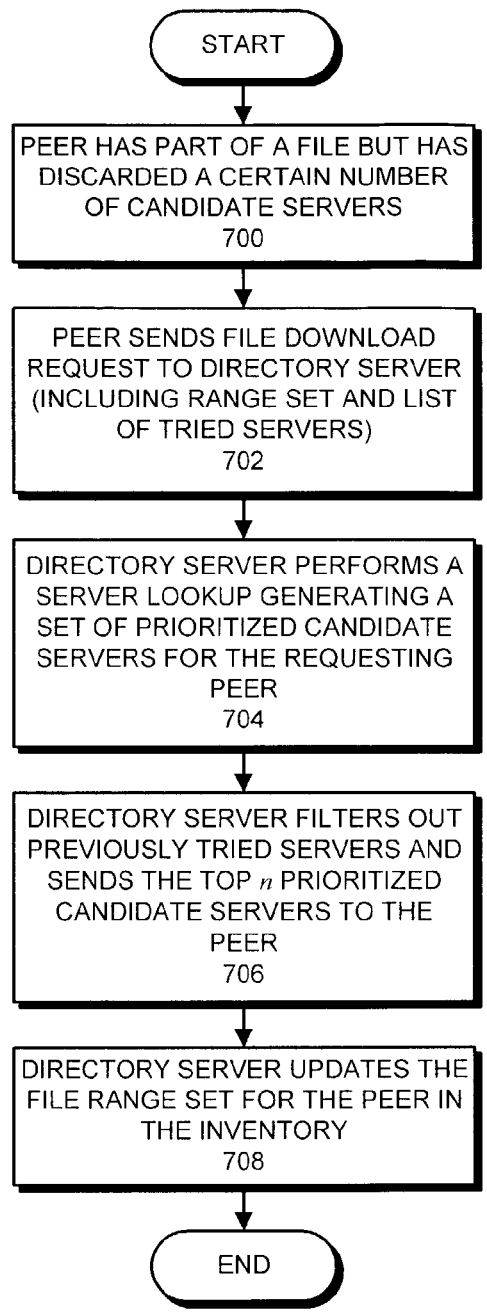
FIG. 7 illustrates processing of a subsequent content request in accordance with an embodiment of the present invention.

FIG. 7 illustrates processing of a subsequent content request in accordance with an embodiment of the present invention. The system starts when peer 101 has received part of a file, but has discarded a certain number of candidate servers for the file (step 700).

First, peer 101 sends a file download request to directory server 104 including an updated range set and a list of tried servers (step 702). Next, directory server 104 performs a server lookup from inventory 212 and generates a prioritized list of candidate servers for peer 101 (step 704). Then, directory server 104 filters out the previously tried servers and returns the top n candidate servers from the prioritized list to peer 101 (step 706). Finally, directory server 104 updates the file range set of the content in inventory 212 for peer 101 (step 708).

Inventory Aging

Figure 8:
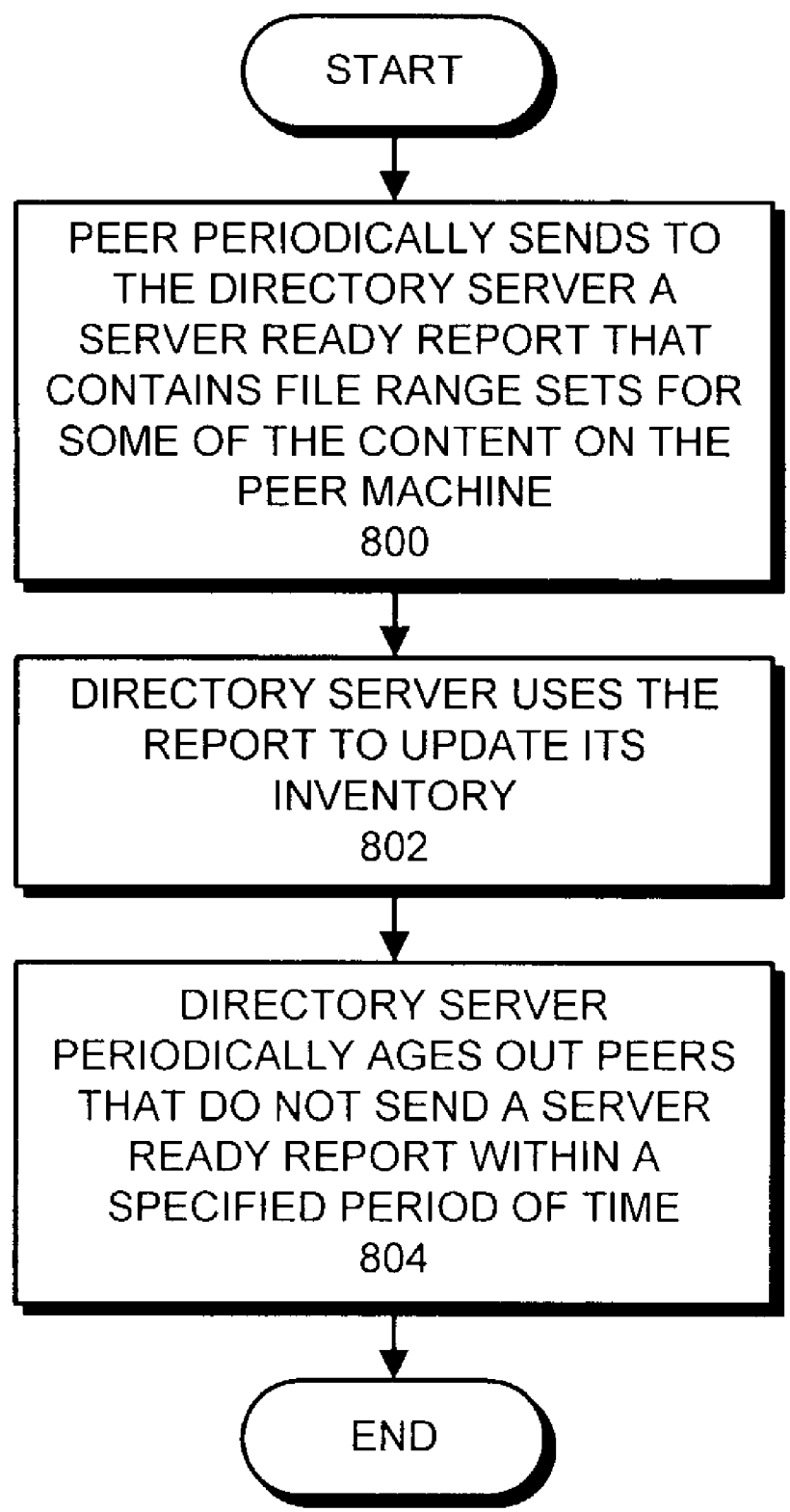
FIG. 8 illustrates the aging of inventory in accordance with an embodiment of the present invention.

FIG. 8 illustrates the process of inventory aging in accordance with an embodiment of the present invention. Peer 101 periodically sends directory server 104 a server ready report that contains file range sets for content that is available on peer 101 (step 800). Note that in one embodiment of the present invention, peer 101 sends the server ready report to logging server 110 which provides the information to directory server 104. Once directory server 104 has this new information, directory server 104 updates inventory 212 to reflect any changes specified by the new information (step 802). In another embodiment of the present invention, peer 101 sends the server ready report directly to directory server 104. Periodically, directory server 104 ages out peers that have not sent a server ready report within a pre-specified period of time (step 804).

Implementation Details

This section provides an overview of the policy governing distribution of data (media objects) in accordance with an embodiment of the present invention. Note that the implementation details described in this section are exemplary and are not meant to limit the present invention.

Peer Overview

The back end of the client (the peer) handles loading and serving, based on metadata and user requests processed by the front end. It devotes a certain number of threads to loading, and to serving (for example, 12 each). Each such loader or server can support one connection. In the absence of throttling, the peer will accept server connections up to this limit, and will establish loader connections up to this limit if there is work to be done.

The peer receives a request to load content. The object is assigned a priority. Higher priority objects are loaded in preference to lower priority objects. If there is work to be done on a higher priority object and no available loader, the lowest priority loader is preempted and reassigned to the higher priority object.

Objects can be prioritized as follows:
1. Objects marked by the front end as foreground take precedence over those marked background.
2. Otherwise, objects are prioritized first-come, first-served.

The peer transforms the load request into a set of candidate servers or targets. These are potential sources for the content, and are prioritized first by object priority, and then by target priority. A free loader takes on the highest priority available target. (An exception to this is that a target that does not support range requests is not taken on if there is any other available or loading target for the same object.) A target is generally never taken on by multiple loaders.

The requested object is marked by the front end as either known or unknown. If it is unknown, then the request will provide a hypertext transfer protocol (http) or file transfer protocol (ftp) uniform resource locator (url). Several targets (for example four, or one if bonding is disabled) representing that url are created. If the object is known, then one target is created, representing the directory server expected to provide further targets. The targets returned by the directory server are labeled with target priorities, all greater than the target priority of the directory server itself.

Targets for a loading object are either loading, available, backed off, or marked bad. If the front end pauses and resumes loading of an object, all of its targets are made available. A target is backed off or marked bad if loading from the target ends in an error. A backed-off target becomes available again at a specified time in the future. Repeated backoffs are for greater time intervals, up to a maximum (for example, ¼, 1, 4, 16, and 64 minutes). The backoff interval is reset by successful loading. The directory server starts at a one minute backoff, even when it returns targets (which resets its back-off interval).

Directory Server Overview

Directory server 104 receives a request for targets for a media object. The request includes the list of targets already known to the requester. Directory server 104 returns a list of targets not already known, with target priorities and the information needed to contact them.

If directory server 104 knows nothing about the object, then it will tell the requester to stall five seconds and try again. Meanwhile, it will contact the metadata server for information about the object. The metadata server contains information about all of the published content including the original source for the content. If this fails, it remembers the failure for a period of time (for example, two minutes), and tells any peers requesting targets for that object that it is not found. (This causes the peers to abort the download.) If the metadata fetch succeeds, then directory server 104 learns of one or more origin servers that it can return as targets.

If directory server 104 provides the requester with potential targets, then it adds the requester to its set of possible targets. The requester will expire out of this set after a period of time (for example, two hours, or immediately if the requester has opted out of the network). To keep the directory server target set fresh, peers report periodically (for example, hour) what objects they can serve.

Directory Server Response Policy

The list of targets (peers and origins) returned for a known object is determined as follows (in order of decreasing precedence):

1. If a target is reported as known by the requester, then it is not returned.
2. Each request from the requester for the object that results in returned targets is counted. If sufficient time has elapsed since the last satisfied request (say 30 minutes), then the count is reset. If the count is 500 or higher, then no peer targets are returned. This protects peer and directory server from excessive requests.
3. At most a pre-specified number of targets are returned.
4. Aged out peers are not returned.
5. Each return of a peer (as a target for any object) is counted. When a peer visits directory server 104, this count is reset to the peer's current number of active serving threads.
6. Targets of highest priority are returned.
7. Origins are assigned lower priority than peers.
8. Peers have a base priority of two. If they have a nonzero return count, then their base priority is one divided by return count. (This distributes load)
9. Peer priority is increased by 330 (=10(32+1)) if it has the same external IP address as the requester. Otherwise, peer priority is increased by 210 (=10(20+1)) if it shares the first 20 bits (configurable) of its external IP address with the requester. Otherwise, peer priority is increased by 10 (=10(0+1)) if it is in the same (nonzero) ASN as the requester. (prefers local sources)

Peer Loader Overview

The peer loader, which is a mechanism that receives a piece of a file, requests data from a target one range at a time. This range size needs to be big enough that the request overhead is small, but small enough that the peer can quickly adapt to changing loader availability and performance. The loader reads this range one read-range at a time. The read-range size, which facilitates throttling, is the expected size downloadable in one second, and has a 10 second timeout. Errors and other loader exit conditions are checked after each read-range, and the read is interruptible if the download is finished or canceled. Request range size is capped at the larger of 128 kB and the read-range.

Range Allocation

A target that does not support range requests is effectively asked for the first needed range. Any other target is asked for a range starting at a preferred offset, and stopping at the size cap, the EOF, or the next range already loaded or allocated to a loader. If a loader reaches a range allocated to another loader, it is preempted (the loader gives up the target, which is made available for other loaders). When there is little left to download, loaders may all load the same range (racing to finish the download).

To find the preferred offset, the loader first generates a candidate range set, then chooses a range from the set. The candidate range set can be the first of the following that is nonempty:

1. set of bytes that are unallocated, that the target has, and that all other incomplete loading targets don't have (so peer is completing a different range than its "neighbors");
2. set of bytes that are unallocated, and that the target has;
3. set of bytes that are unallocated; and
4. set of bytes that are allocated to another loader.

Then the chosen range from that range set can be either:

1. contiguous with the last range received from the target;
2. part of an open-ended range at the end of a set of unknown maximum size;
    The offset is at a distance of 32 * (the range size cap) from the beginning of this range. (This is to discover how far the file extends by stepping out until EOF is found.)
3. part of the largest range in the range set;
    The offset is at the middle of this range if there are enough bytes thereafter for a full size range, or if the range bytes are allocated to another loader. (If loaders attempt to start their loads as far from each other as possible, then they will be better able to load contiguously before bumping into something already loaded by someone else.)

Otherwise, the offset is at the beginning of this range. (So ranges are not subdivided down to inefficiently small sizes.)

Errors

I/O errors cause a backoff. An exception is when a connection to a peer target cannot be made; this causes the target to be marked bad. If a target reports an inconsistent file size, or that it doesn't have the object file or doesn't grant permission to load, then the target is marked bad. If the directory server returns such a report, then the download is aborted.

Every file has a signature that is composed of a set of block signatures. During the download, each 1 MB block is checked as it is completed. If a block check fails, then any peer targets contributing to it are marked bad. If the block was supplied entirely by origins, then the download is aborted.

A backoff error can also be caused by poor service. Poor service can be defined as no bytes for two minutes, or if after two minutes all loaders are busy, and there is an available target for the object, and this loader is getting less than a third the average bandwidth for loaders of this object or less than 250 bytes/sec.

A stall request greater than ten seconds, or one from a directory server, is handled as a backoff (the loader gives up the target) rather than a pause.

Peer Server Overview

If a peer is opted out of the network, or does not know of an object, or its copy is bad, then it will not serve the object.

Otherwise, it serves the largest contiguous range of bytes that it has that have been signature checked (if there was a block signature) and that the requester requested. Signature checking involves calculating a checksum of a block, and comparing it to an encrypted checksum from a trusted source to ensure data integrity. If there are no such bytes, then the server will tell the requester to stall for 5 seconds and then try again. The server reports what bytes it has to the requester, so the next request can be better informed. If the server is still loading the object, then it adds the requester to its list of targets. (The server learns what bytes the requester has as part of the request.)

Implementation Notes

Each peer, and the directory server, maintains an in-memory database, or inventory, of objects and targets. The inventory is a set of object entries (MOs), a set of peer and origin entries (Nodes), and a set of entries with information about the state of the object on the peer or origin (MONodes). Each entry contains information about the relevant entity. For example, Nodes contain contact information such as IP addresses and ports, and MONodes contain a range set that records which portions of an object file are available on a peer or origin. The inventory also maintains subsets of these sets sorted by various criteria to make access fast. For example, the inventory maintains subsets of MONodes sorted by object and then by target priority. The directory server lazily removes expired entries. The peer removes target entries when the download is complete or canceled, and removes object entries when the object is deleted.

Secure Propagation of Content

Figure 9:
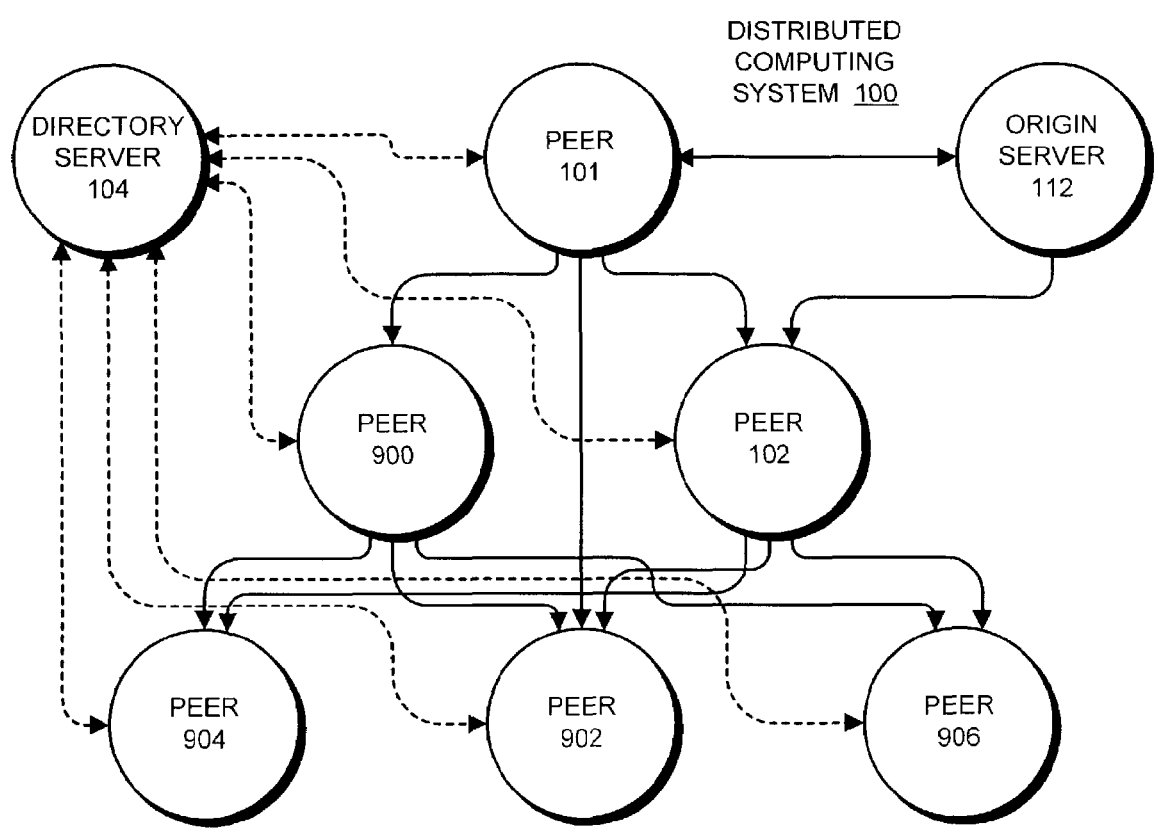
FIG. 9 illustrates secure propagation of content in accordance with an embodiment of the present invention.

FIG. 9 illustrates secure propagation of content in accordance with an embodiment of the present invention. In one embodiment of the present invention, peer 101 is the first client to request a newly published piece of content. Peer 101 sends a request for the content to directory server 104, and receives a list of candidate servers and a list of checksums in return. This list of checksums is encrypted using a destination public key and is also digitally signed using a source private key.

In this example, the only server with the content available for download is origin server 112. However, note that there may also be mirror servers similar to origin server 112 that contain copies of the content for downloading. Also note that the list of checksums can be received from a server, such as directory server 104 or, alternatively, a special-purpose metadata server.

Peer 101 then decrypts the list of checksums using the destination private key and verifies the digital signature using a source public key. If these operations are successful, peer 101 begins to download the content in blocks from origin server 112. As peer 101 receives the blocks of content, peer 101 calculates a checksum for each block and compares it against the corresponding checksum from the list of checksums. If the checksums match, the block of content is accepted and is available for sending to other clients. However, if the checksums do not match, the block of content is then discarded, and that block is requested again.

Assume that sometime after peer 101 has started receiving content, peer 102 requests the same content from directory server 104. In this case, directory server 104 hands back a list of candidate servers to peer 102; this list contains peer 101 and origin server 112. (Note that origin server 112 always appears in the list of candidate servers at the lowest priority.) Directory server 104 also sends an encrypted list of checksums for the content to peer 102.

Peer 102 then proceeds to download blocks of the content from peer 101 and origin server 112. Note that peer 101 can forward validated blocks of content to peer 102 prior to peer 101 receiving all of the blocks of content from origin server 112.

In the example illustrated in FIG. 9, distributed computing system 100 also contains peers 900 to 906 which have also requested the same piece of content. Note that as more and more peers request the content, the system expands in a graph structure where any peer that has already started receiving blocks of content can potentially serve the content to other peers.

Process of Secure Propagation of Content

Figure 10:
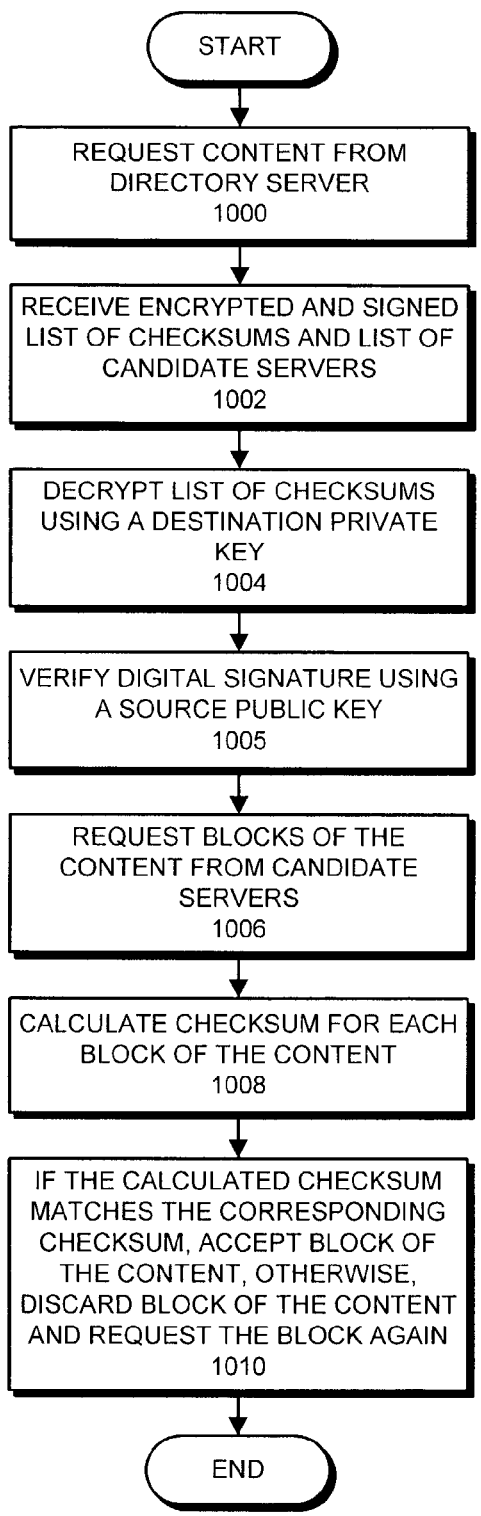
FIG. 10 presents a flowchart illustrating the process of secure propagation of content in accordance with an embodiment of the present invention.

FIG. 10 presents a flowchart illustrating the process of secure propagation of content in accordance with an embodiment of the present invention. The system starts when peer 101 requests content from directory server 104 (step 1000). In response to this request, peer 101 receives an encrypted and signed list of checksums and a list of candidate servers from directory server 104 (step 1002). Next, peer 101 decrypts the list of checksums using a destination private key (step 1004) and verifies the digital signature using a source public key (step 1005). The system then requests blocks of the content from the candidate servers (step 1006). Once a block of the content has been received, peer 101 calculates a checksum for the block (step 1008). If the calculated checksum matches the corresponding checksum received from directory server 104, peer 101 accepts the block of content. Otherwise, peer 101 discards the block of content and requests the block again (step 1010). Note that steps 1008 and 1010 are repeated for each block of content.

Process of Publishing Content

Figure 11:
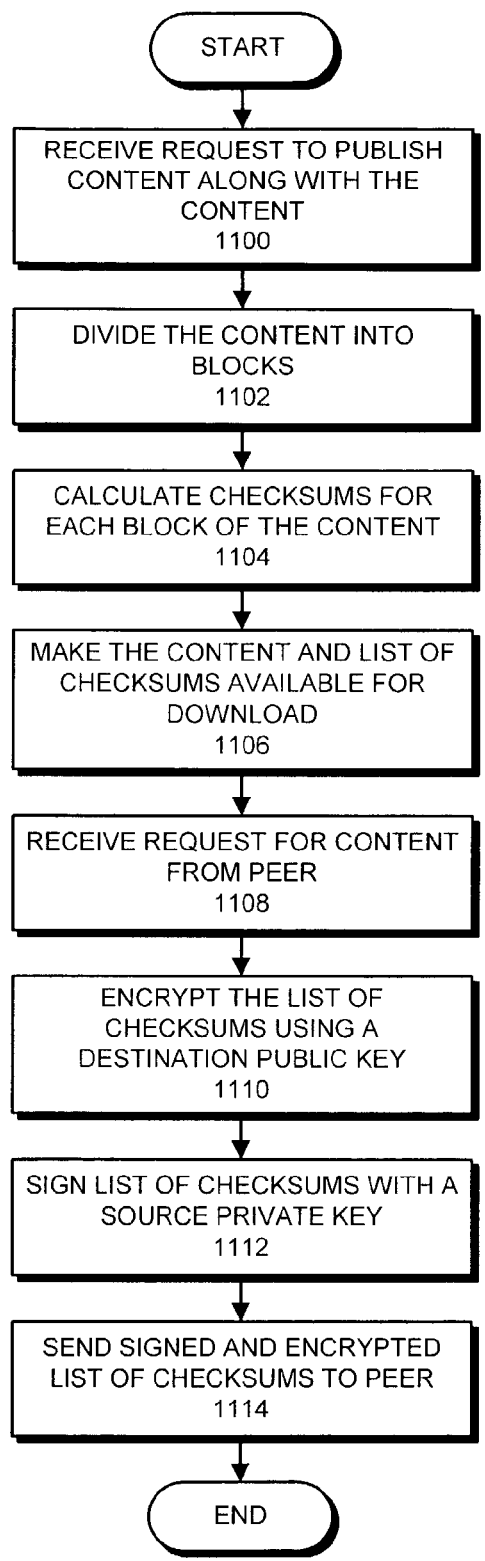
FIG. 11 presents a flowchart illustrating the process of publishing content in accordance with an embodiment of the present invention.

FIG. 11 presents a flowchart illustrating the process of publishing content in accordance with an embodiment of the present invention. The system starts when directory server 104 receives a request to publish content along with the content itself (step 1100). Upon receiving the content, directory server 104 divides the content into blocks (step 1102) and calculates a checksum for each block (step 1104). Directory server 104 then makes the content and the list of checksums available for download (step 1106). This involves sending the content to origin server 112 and storing the encrypted list of checksums locally at directory server 104, or alternatively, on a special-purpose metadata server.

Upon receiving a request for the content from a peer (step 1108), directory server 104 encrypts the list of checksums using a destination public key (step 1110) and digitally signs the content using a source private key (step 1112) before sending the signed and encrypted list of checksums to the peer (step 1114). This allows the peer to download and decrypt the content.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for receiving content at a first peer from a primary peer and forwarding it to a secondary peer, wherein blocks of the content are sent to the secondary peer prior to all of the blocks of the content being received from the primary peer, comprising:

a first peer indicating a request for the blocks of content to a directory server, wherein indicating the request causes the first peer to be placed on a list of candidate peers;

the first peer receiving an encrypted list of checksums from the directory server, wherein each checksum in the list is associated with a corresponding block of the content, and wherein the encrypted list of checksums is received separately from any block of content;
receiving a block of the content from the primary peer;
calculating a checksum for the block of the content;
locating the checksum in the list of checksums received from the directory server;
if the calculated checksum is located,
determining that the block is valid and that the block can be sent from the first peer to other peers; and
if the secondary peer requests the block from the first peer, sending the block of the content to the secondary peer otherwise,
discarding the block of content; and
requesting the block of content again.

2. The method of claim 1, further comprising using a source public key to verify a digital signature received with the encrypted list of checksums.

3. The method of claim 1, wherein each block of the content spans multiple network packets.

4. The method of claim 1, wherein each block of the content spans multiple disk blocks.

5. The method of claim 1, further comprising receiving different blocks of the content from different primary peers.

6. The method of claim 1, further comprising sending the block of the content to multiple secondary peers.

7. The method of claim 1, wherein decrypting the encrypted list of checksums involves decrypting the encrypted list of checksums using a destination private key.

8. The method of claim 1, wherein receiving the block of the content from the primary peer involves receiving an encrypted block of the content.

9. The method of claim 1, wherein sending the block of the content to the secondary peer involves encrypting the block of content to form an encrypted block of content that is sent to the secondary peer.

10. A method for publishing content in a distributed content delivery network, comprising:
receiving a request at a server from a first peer to publish content along with the content to be published;
dividing the content into blocks;
calculating a separate checksum for each block of the content and placing the checksum for each block of content in a list;
encrypting the list to form an encrypted list of the checksums; and
supplying the encrypted list of checksums to a directory server, the directory server for serving the encrypted list of checksums to peers separately from any block of content;
supplying information about the blocks of content to the first peer, to enable the first peer to serve the content to peers;
creating a candidate peer list including the first peer, the candidate peer list used in downloading.

11. The method of claim 10, wherein encrypting the checksums involves using a destination public key to encrypt the checksums.

12. The method of claim 11, further comprising using a source private to digitally sign the encrypted list of checksums.

13. A computer-readable storage medium storing instructions that when executed by a computer cause the computer to perform a method for receiving content at a first peer from a primary peer and forwarding it to a secondary peer, wherein blocks of the content are sent to the secondary peer prior to all of the blocks of the content being received from the primary peer, the method comprising:
a first peer indicating a request for the blocks of content to a directory server, wherein indicating the request causes the first peer to be placed on a list of candidate peers;
the first peer receiving an encrypted list of checksums from the directory server, wherein each checksum in the list is associated with a corresponding block of the content, and wherein the encrypted list of checksums is received separately from any block of content;
receiving a block of the content from the primary peer;
calculating a checksum for the block of the content;
locating the checksum in the list of checksums received from the directory server;
if the calculated checksum is located,
determining that the block is valid and that the block can be sent from the first peer to other peers; and
if the secondary peer requests the block from the first peer, sending the block of the content to the secondary peer otherwise,
discarding the block of content; and
requesting the block of content again.

14. The computer-readable storage medium of claim 13, wherein the method further comprises using a source public key to verify a digital signature received with the encrypted list of checksums.

15. The computer-readable storage medium of claim 13, wherein each block of the content spans multiple network packets.

16. The computer-readable storage medium of claim 13, wherein each block of the content spans multiple disk blocks.

17. The computer-readable storage medium of claim 13, wherein the method further comprises receiving different blocks of the content from different primary peers.

18. The computer-readable storage medium of claim 13, wherein the method further comprises sending the block of the content to multiple secondary peers.

19. The computer-readable storage medium of claim 13, wherein decrypting the encrypted list of checksums involves decrypting the encrypted list of checksums using a destination private key.

20. The computer-readable storage medium of claim 13, wherein receiving the block of the content from the primary peer further involves receiving an encrypted block of the content.

21. The computer-readable storage medium of claim 13, wherein sending the block of the content to the secondary peer further involves encrypting the block of content to form an encrypted block of content that is sent to the secondary peer.

22. A computer-readable storage medium storing instructions that when executed by a computer cause the computer to perform a method for publishing content in a distributed content delivery network, the method comprising:
receiving a request at a server from a first peer to publish content along with the content to be published;
dividing the content into blocks;
calculating a separate checksum for each block of the content and placing the checksum for each block of content in a list;
encrypting the list to form an encrypted list of the checksums; and
supplying the encrypted list of checksums to a directory server, the directory server for serving the encrypted list of checksums to peers;

supplying information about the blocks of content to the first peer, to enable the first peer to serve the content to peers;

creating a candidate peer list including the first peer, the candidate peer list used in downloading.

23. The computer-readable storage medium of claim 22, wherein encrypting the checksums involves using a destination public key to encrypt the checksums.

24. The computer-readable storage medium of claim 22, wherein the method further comprises using a source private key to digitally sign the encrypted list of checksums.

25. An apparatus for receiving content at a first peer from a primary peer and forwarding it to a secondary peer, wherein blocks of the content are sent to the secondary peer prior to all of the blocks of the content being received from the primary peer, comprising:

a requesting mechanism to indicate a request for the blocks of content to a directory server, wherein indicating the request causes the first peer to be placed on a list of candidate content servers;

a receiving mechanism configured to receive an encrypted list of checksums from the directory server, wherein each checksum in the list is associated with a corresponding block of the content, wherein the encrypted list of checksums is received separately from any block of content the receiving mechanism further to receive a block of the content from the primary peer;

a calculation mechanism configured to calculate a checksum for the block of the content;

a locating mechanism configured to locate the checksum in the list of checksums;

a delivery mechanism to, if the calculated checksum is located, determine that the block is valid and that the block can be sent from the first peer to other peers; and if the secondary peer requests the block from the first peer, to send the block of the content to the secondary peer;

if the calculated checksum does not match the corresponding checksum, the delivery mechanism to discard the block of content and request the block of content again.

26. The apparatus of claim 25, further comprising a signature verification mechanism configured to use a source public key to verify a digital signature received with the encrypted list of checksums.

27. The apparatus of claim 25, wherein each block of the content spans multiple network packets.

28. The apparatus of claim 25, wherein each block of the content spans multiple disk blocks.

29. The apparatus of claim 25, wherein the receiving mechanism is further configured to receive different blocks of the content from different primary peers.

30. The apparatus of claim 25, wherein the delivery mechanism is further configured to send the block of the content to multiple secondary peers.

31. The apparatus of claim 25, wherein the decryption mechanism is further configured to decrypt the encrypted list of checksums using a destination private key.

32. The apparatus of claim 25, wherein the receiving mechanism is further configured to receive an encrypted block of the content.

33. The apparatus of claim 25, wherein the delivery mechanism is further configured to encrypt the block of content to form an encrypted block of content to send to the secondary peer.

34. An apparatus for publishing content in a distributed content delivery network, comprising:

a receiving mechanism to receive a request at a server from a first peer to publish content along with the content to be published;

a dividing mechanism to divide the content into blocks;

a calculation mechanism configured to calculate a separate checksum for each block of the content and place the checksum for each block of content in a list;

an encryption mechanism configured to encrypt the list to form an encrypted list of the checksums;

a delivery mechanism to supply the encrypted list of checksums to a directory server, to be served to peers separately from any block of content, and to supply information about the content to the first peer, to enable the first peer to serve the content to peers; and an adding mechanism to create a candidate peer list including the first peer, the candidate peer list used in downloading.

35. The apparatus of claim 34, wherein the encrypting mechanism is further configured to encrypt the checksums using a destination public key.

36. The apparatus of claim 34, further comprising a digital signature mechanism that is configured to use a source private to digitally sign the encrypted list of checksums.

37. A method of downloading content in a peer-to-peer system comprising:

indicating a request for the content to a directory server;

receiving an encrypted list of checksums and a list of candidate peers from the directory server;

contacting a first candidate peer from the list of candidate peers;

receiving a block of the content from the first candidate peer;

determining a checksum for the block of the content;

locating the checksum in the list of checksums; and if the calculated checksum is located, determining that the block is valid.

38. The method of claim 37, further comprising:

receiving a request for the block of the content from a second peer; and providing the block of the content to the second peer, if the block is valid.

39. A method of uploading content in a peer-to-peer system comprising, at a server:

receiving data;

separating the data into one or more content blocks;

calculating a checksum for each of the one or more content blocks and placing the checksum in a list of checksums;

encrypting the list of checksums;

providing the list of checksums to a directory server, to be served to a requesting peer separately from any content; and providing data about the one or more content blocks to a first peer, the first peer to serve at least one of the one or more content blocks to the requesting peer.

40. The method of claim 39, wherein providing data to the first peer comprises providing the one or more content blocks to the first peer.

41. The method of claim 39, wherein providing data to the first peer comprises providing block size data of the one or more content blocks to the first peer.

42. The method of claim 39, further comprising:

creating a list of candidate peers including the first peer, the list of candidate peers able to serve the content to requesting peers.

* * * * *